United States Patent
Hijar Miranda et al.

(10) Patent No.: US 12,511,223 B2
(45) Date of Patent: Dec. 30, 2025

(54) MACHINE LEARNING-BASED TEST SELECTION FOR AUTOMATED CODE VALIDATION

(71) Applicant: Microsoft Technology Licensing, LLC, Redmond, WA (US)

(72) Inventors: Jose Antonio Hijar Miranda, Jalisco (MX); Luke Robert Schoen, Woodinville, WA (US); Mitansh Rakesh Shah, Seattle, WA (US); Jorge Alejandro Velasco Reyna, Jalisco (MX); Samuel Akwesi Yeboah, Houston, TX (US); Sereym Baek, Marietta, GA (US); Michael Joseph Laucella, Flushing, NY (US); Everson Ramon Rodriguez Muniz, Bellevue, WA (US); Ranjodh Singh Sandhu, St. Visalia, CA (US); Florin Lazar, Woodinville, WA (US); Robert Allen Land, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 18/466,446

(22) Filed: Sep. 13, 2023

(65) Prior Publication Data
US 2025/0086095 A1  Mar. 13, 2025

(51) Int. Cl.
*G06F 11/362* (2025.01)
*G06N 20/00* (2019.01)

(52) U.S. Cl.
CPC ......... *G06F 11/3624* (2013.01); *G06N 20/00* (2019.01)

(58) Field of Classification Search
None
See application file for complete search history.

(56) References Cited

U.S. PATENT DOCUMENTS

| 11,681,811 B1 * | 6/2023 | Dixit | G06F 8/65 |
|---|---|---|---|
|  |  |  | 726/25 |
| 2014/0325191 A1 * | 10/2014 | Matsuo | G06F 11/3656 |
|  |  |  | 712/227 |

(Continued)

OTHER PUBLICATIONS

"Cut Test Time up to 70% with Predictive Test Selection", Retrieved From: https://gradle.com/gradle-enterprise-solutions/predictive-test-selection/. Retrieved on Aug. 2, 2023, 5 Pages.

(Continued)

*Primary Examiner* — Toan H Vu
(74) *Attorney, Agent, or Firm* — Schwegman Lundberg & Woessner, P.A.

(57) ABSTRACT

A machine learning model is trained from characteristics of code changes and characteristics of tests to generate an output indicative of a likely test result of running a corresponding test on a code change. One or more machine learning models may be trained for a specific code repository and based on developer feedback. When a code change is generated by a developer to code in a code repository, a machine learning model is selected based on the repository and characteristics or features of the code change are extracted and input to the machine learning model. The machine learning model generates a model output indicative of the likely test results of running each of a plurality of different tests on the code change. The model output indicates how likely it is that each of the plurality of different tests will fail. Based on the model output, a test selection system selects a subset of the plurality of different tests that should be run against the code changes.

20 Claims, 7 Drawing Sheets

(56) References Cited

U.S. PATENT DOCUMENTS

| | | | | |
|---|---|---|---|---|
| 2017/0132119 | A1* | 5/2017 | Xu | G06F 11/368 |
| 2020/0097388 | A1* | 3/2020 | Bhat | G06F 11/3608 |
| 2022/0091967 | A1* | 3/2022 | Wang | G06F 11/3684 |
| 2022/0138385 | A1* | 5/2022 | Patidar | G06F 30/327 |
| | | | | 716/136 |
| 2022/0164171 | A1* | 5/2022 | Johnson | G06F 8/77 |
| 2023/0004486 | A1* | 1/2023 | Drozhak | G06F 11/3692 |
| 2023/0297491 | A1* | 9/2023 | Sariel | G06F 11/366 |
| | | | | 717/124 |
| 2023/0315618 | A1* | 10/2023 | Zhang | G06N 3/09 |
| | | | | 717/124 |
| 2023/0385185 | A1* | 11/2023 | Kim | G06N 20/00 |
| 2024/0095151 | A1* | 3/2024 | Ramakrishnan | G06F 11/3676 |
| 2024/0354069 | A1* | 10/2024 | Polton | G06F 8/35 |
| 2025/0037877 | A1* | 1/2025 | Glik | G16H 50/30 |
| 2025/0061047 | A1* | 2/2025 | Sun | G06F 11/3692 |

OTHER PUBLICATIONS

Machalica, et al., "Predictive Test Selection", In Repository of arXiv:1810.05286v2, May 29, 2019, 10 Pages.

* cited by examiner

MACHINE LEARNING-BASED TEST SELECTION FOR AUTOMATED CODE VALIDATION

BACKGROUND

Computer systems are currently in wide use. Some such computer systems run or host applications and/or services based on code in a code base. The applications and/or services are accessed by tenant systems or other user systems.

In order to develop such applications and/or services, developers often generate code that is stored in the code base and that is run to implement the application and/or service. As developers continue to develop and maintain the code, the developers often make changes to the code, or add code to the code base. Prior to checking the new or modified code into the code base, developers often run automated tests to test the functionality in the new or modified code.

As a code base grows, the quantity of automated tests that may be run against that code base grows as well. Thus, it is not uncommon to run a large number of tests on code changes or code additions before checking the code changes or additions in to a large code base.

The discussion above is merely provided for general background information and is not intended to be used as an aid in determining the scope of the claimed subject matter.

SUMMARY

A machine learning model is trained from characteristics of code changes and characteristics of tests to generate an output indicative of a likely test result of running a corresponding test on a code change. One or more machine learning models may be trained for a specific code repository and based on developer feedback. When a code change is generated by a developer to code in a code repository, a machine learning model is selected based on the repository and characteristics or features of the code change are extracted and input to the machine learning model. The machine learning model generates a model output indicative of the likely test results of running each of a plurality of different tests on the code change. The model output indicates how likely it is that each of the plurality of different tests will fail. Based on the model output, a test selection system selects a subset of the plurality of different tests that should be run against the code changes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
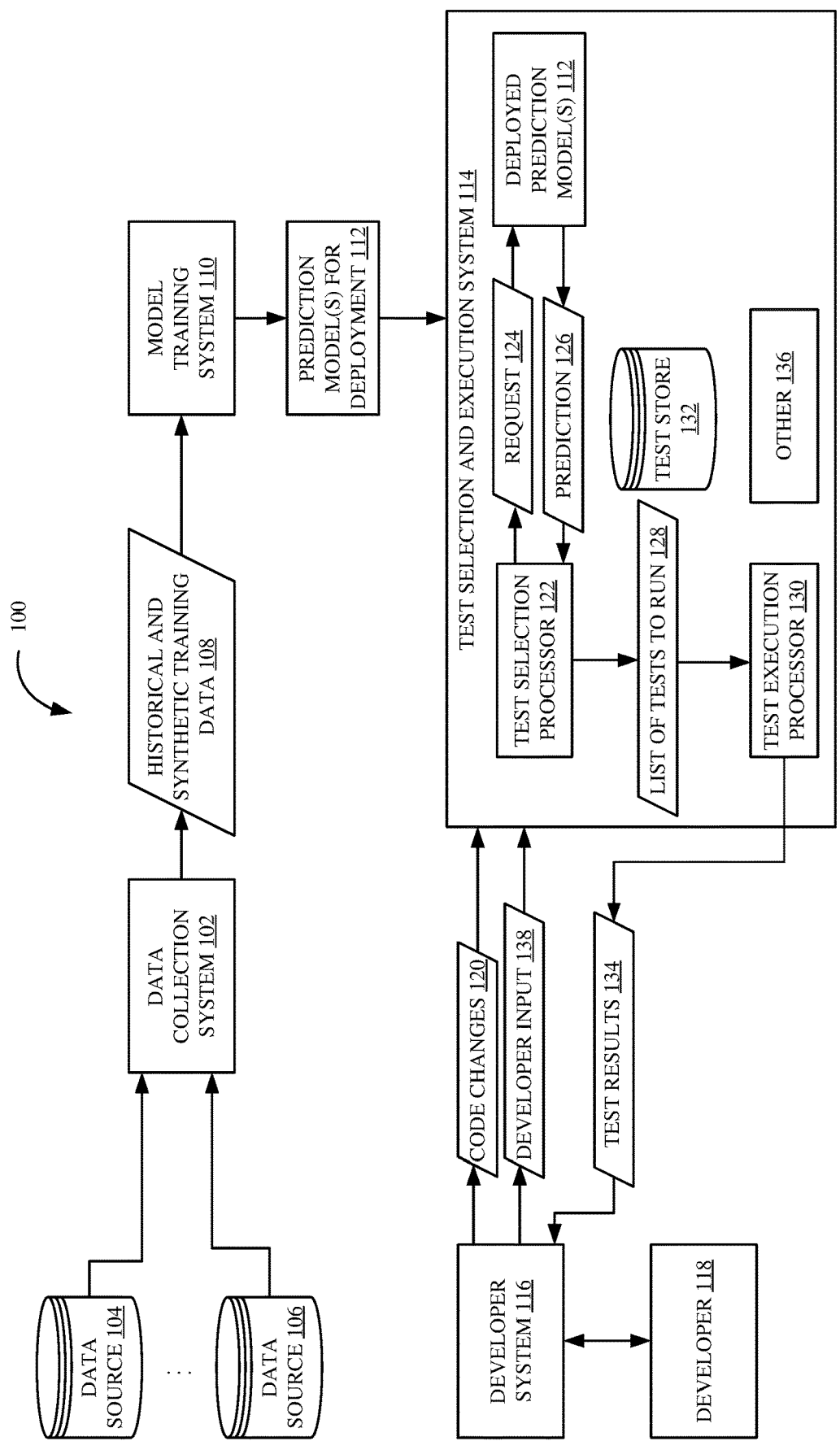
FIG. 1 is a block diagram of one example of a computing system architecture.

As discussed above, as code bases in various computing systems grow in size, the number of automated tests that may be run against those code bases also increases. Similarly, the computing system resources required to run the number of tests grows quickly making it progressively more expensive for developers to check in new code or revised code (collectively referred to as code changes).

However, many of the available tests do not provide any meaningful information to the developer. For instance, many of the available tests test functionality that is unrelated to the code changes and those tests simply do not need to be run because the outcome of such tests will not be affected by the code changes. Thus, running such tests consumes time and computing system resources that need not be consumed, lending to inefficiency in the testing process.

One significant item that developers learn when running tests is which tests fail. Therefore, the present description describes a system in which a machine learning model is trained to identify how likely it is that each of the tests, in the plurality of available tests, will fail when run against a set of code changes. The machine learning model can then be evaluated using recall and precision metrics. The recall metric indicates how well the model is performing in identifying all tests that are likely to fail. The precision metric indicates how well the model is performing in identifying only tests that are likely to fail (and thus excluding or filtering out tests that are likely to pass).

In one example, the machine learning model is trained on a combination of characteristics (or features) of code changes and characteristics (or features) of the various tests that are available, as well as on developer feedback. The model can be trained for a particular repository and is trained to receive an input indicative of a code change to code in the repository and identify one or more tests to evaluate and, based on the inputs, generate an output indicating how likely it is that each of the one or more identified tests will fail if run against the code change. Thus, in one example, every time a code change is about to be checked into a repository by a developer, features of the code change can be automatically extracted and a model can be selected based on the repository corresponding to the code change. The model can automatically identify the likelihood that each of the available tests will fail given the features of the code change. If the likelihood or probability of failure for a given test meets a threshold value, then the test can be selected for running against the code change. In one example, by automatically it is meant that the process or function is performed without further human involvement except, perhaps, to initiate or authorize the process or function.

In one example, developer feedback can also be incorporated into the system. For instance, if the developer notices that the model failed to select one or more tests (that the developer wanted to run), then the identity of those tests can be fed back to the model training system as training data. The training data identifies tests that should have been identified by the machine learning model for the code change that was just input by the developer. Such information can be incorporated into the model training process. Similarly, when the developer provides a code change, the developer may also provide a list of tests that the developer wishes to be included. The identity of such tests can be incorporated as inputs to the machine learning model in order to identify the set of tests that are likely to fail, and that should thus be run on the code changes. The present system thus greatly reduces the number of tests that need to be run against code changes while still running the tests that are likely to provide meaningful information to a developer. This reduces the time and computing system resources needed to run tests on code changes. For example, it has been found that the present system can reduce the number of tests run on some code changes by up to ninety percent (90%) while still testing the functionality of the code changes.

FIG. 1 is a block diagram of one example of a computing system architecture 100 in which a data collection system 102 collects data from a plurality of different data sources 104-106 and extracts historical and synthetic training data 108 that can be used by model training system 110. Model training system 110 uses the training data 108 to perform a machine learning process in order to generate a prediction model 112 that can be deployed in a test selection and execution system 114. Prediction model 112 (when deployed in system 114) can receive characteristics or features of code changes as an input, and generate, as an output, a likelihood or probability that each of a plurality of different available tests will fail based on the code changes.

FIG. 1 also shows a developer system 116 which can be accessed by a developer 118 to develop code changes 120 for code in a code base which may be stored in a source code repository. One source code repository may store code for one or more projects or software components. The code changes 120 can be provided to test selection and execution system 114 where test selection processor 122 extracts features from the code changes 120 and generates a request 124, including those features. The request 124 can be provided to prediction model 112 which generates an output prediction 126 that identifies a likelihood or probability that each of a plurality of available tests will fail, if run on the code changes 120. Test selection processor 122 can then identify a list of tests to run 128, based on the likelihood or probability that those tests will fail and based upon a threshold value that is used for test selection. Test execution processor 130 then loads the identified tests from test store 132 and runs the tests against code changes 120, to test the functionality of the code changes 120, and to generate an output indicative of the test results 134. Test selection and execution system 114 can include other items 136 as well.

In one example, developer 118 may also provide a developer input 138. The developer input may be provided at the beginning of the testing process where developer 118 specifies certain tests that developer 118 would like test execution processor 130 to run. That developer input 138 can also be provided to prediction model 112 for use in predicting which tests are likely to fail. In yet another example, developer 118 can provide developer input 138 as feedback based upon the test results 134 which indicate the list of tests that were run. For instance, developer 118 may provide feedback, as developer input 138, indicating that prediction model 112 missed a test that developer 118 would like to have run. The developer feedback 138 can be provided, in such a scenario, to model training system 110 which can incorporate that developer feedback into the training algorithm in re-training model 112, or in training a subsequent prediction model. In one example, once developer 118 sees which tests where run, developer 118 can reply using a predefined template, with specific text identifiers identifying tests that developer 118 believes should have been identified by the model to be run. A developer input system (described below with respect to FIG. 2), parses the developer feedback on the template to extract the list of tests. This list, along with the code changes can then be used in training.

It should also be noted that prediction model 112 can be any of a variety of different types of models, or model 112 can be comprised of a plurality of models. For instance, prediction model 112 may be a model that generates an output indicating the likelihood or probability that a particular test will fail given a code change to code in a particular repository. There may, however, be some tests that are less important than other tests. Therefore, model 112 may also, (or instead), incorporate a model that generates an output indicative of the likelihood or probability that a test will fail and also indicating the importance level of that test. For instance, in some systems, there are certain tests that nearly always fail. The test results from those tests thus become less important to the developer in evaluating the performance of his or her code changes. Therefore, model 112 may indicate that even though the likelihood or probability that the test will fail is relatively high, the importance of that test is relatively low. This determination of importance can be incorporated into model 112, or the determination of the importance of the test results can be made by test selection processor 122 during test selection, or the determination can be incorporated into the system in other ways as well. The importance of a particular test may be determined based on a wide variety of different criteria. For example, the importance criteria may include how often the test fails relative to how often it is run. The importance criteria may also be identified by applying a set of rules over the history of test results. The rules may be evaluated against the historic test results and the rules may be modified, as desired to evaluate the tests against a variety of different criteria. The importance criteria may include developer generated importance ratings or any other importance criteria.

Figure 2A:
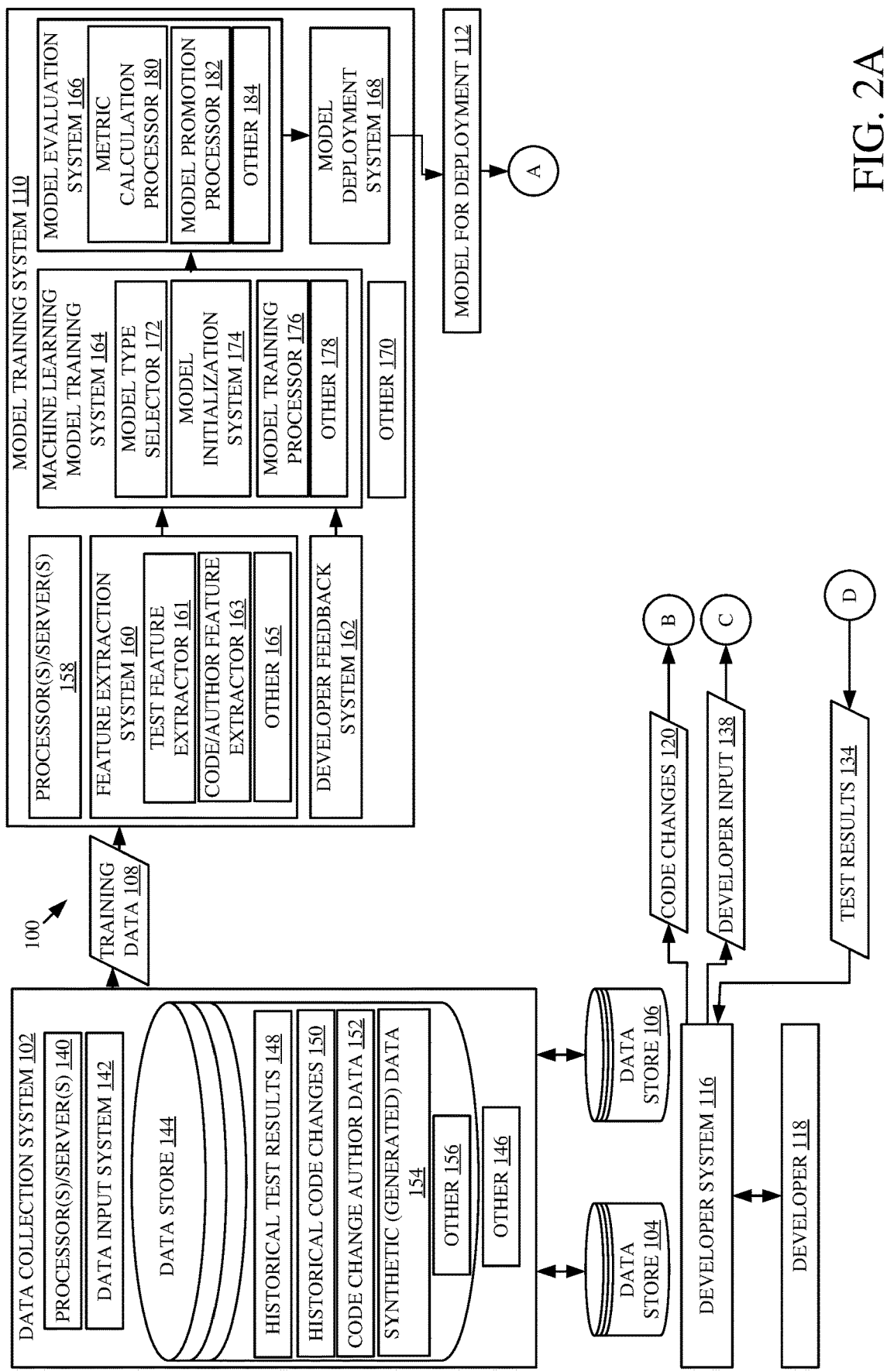
FIGS. 2A and 2B (collectively referred to herein as FIG. 2) show a block diagram illustrating one example of the computing system architecture illustrated in FIG. 1, with some portions shown in more detail.
Figure 2B:
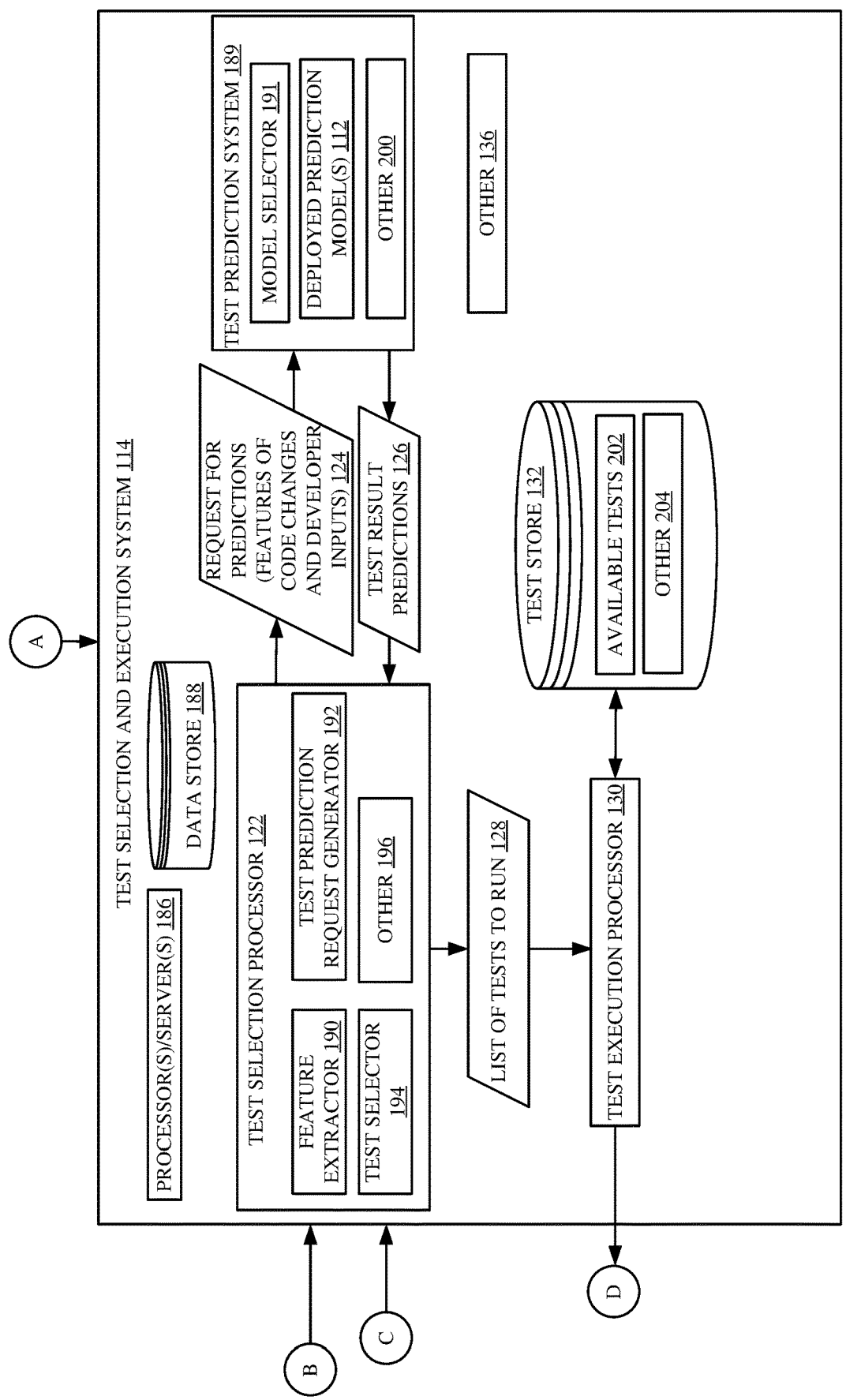

FIGS. 2A and 2B (collectively referred to herein as FIG. 2) illustrate a block diagram (and data flow diagram) showing one example of the computing system architecture 100 described above with respect to FIG. 1 with some items shown in more detail. Items in FIG. 2 that are similar to those shown in FIG. 1 are similarly numbered. In the example shown in FIG. 2, data collection system 102 can include one or more processors or servers 140, data input system 142, data store 144, and other items 146. Data store 144 can include historical test results 148, historical code changes 150, code change author data 152, synthetic (or generated) data 154, and other items 156. Model training system 110 can include one or more processors or servers 158, feature extraction system 160, developer feedback system 162, machine learning model training system 164, model evaluation system 166, model deployment system 168, and other items 170. Feature extraction system 160 can include test feature extractor 161, code/author feature extractor 163, and other items 165. Machine learning model training system 164 can include model type selector 172, model initialization system 174, model training processor 176, and other items 178. Model evaluation system 166 can include metric calculation processor 180, model promotion processor 182, and other items 184.

Test selection and execution system 114 can include one or more processors or servers 186, data store 188, and test prediction system 189. Test selection processor 122 can include feature extractor 190, test prediction request generator 192, test selector 194, and other items 196. Deployed prediction models 112 can be deployed in test prediction system 189, which may include model selector 191 and other items 200 as well. Test store 132 can include a plurality of available tests 202, and other items 204. Before describing the operation of architecture 100 in more detail, a description of some of the items in architecture 100, and their operation, will first be provided.

Data input system 142 can be a crawler or other item that accesses data stores 104-106 to obtain training data for model training system 110. The data sources 104-106 may include graph data or organization data which includes information about people, teams, groups, organization structures, projects, responsibilities, and other information about developer 118 and other people in the organization to which developer 118 belongs. Data sources 104-106 can include historical code changes that have been developed, in the past, to the current code base or other code bases. Data sources 104-106 can include historical test results which identify the results of running various different tests on the historical code changes. Data sources 104-106 may include synthetic or generated data which may include such things as simulated code changes, test results generated based on the simulated code changes, or other synthetic data. Data input system 142 accesses the data sources 104-106 and extracts and stores the training data in data store 144. In one example, the particular code repository that the training data came from can also be noted or identified. The training data can include such things as historical test results 148 or characteristics of historical tests and test results, historical code changes 150 or characteristics of such code changes, code change author data 152 (which may include information describing various authors of code changes—including developer 118), and synthetic or generated data 154. Data collection system 102 provides historical and synthetic training data (including author data) as training data 108 to model training system 110. Feature extraction system 160 extracts features from the training data 108 that can be used to train model 112. Test feature extractor 161 generates or accesses features of the various available tests 202 in test store 132. Such features may include characteristics of the tests and other features, some of which are described below. Code/author feature extractor 163 extracts or obtains features from the training data 108 indicative of the characteristics or features of code changes and corresponding test results, as well as author data and synthetic data. Some examples of such features are also discussed below. Developer feedback system 162 can also extract features from developer feedback (e.g., developer input 138) where such feedback is available.

Machine learning model training system 164 then uses model type selector 172 to select a type of model that is to be trained and model initialization system 174 initializes that selected model for training. In one example, models are trained for a specific code repository. Model type selector 172 can select, for example, a type of model that generates an output indicative of the probability that a particular test will fail, or a model that generates an output indicative of the probability that a particular test will fail along with an importance measure corresponding to that test. Model type selector 172 can select any of a wide variety of other types of models as well. The model training system 110 allows the types of models to be extended. Therefore, there can be additional model types defined and trained per repository. For example, one source code repository may have a first set of model types trained for to identify tests to run on code changes to the code in that repository. A second source code repository may have a second set of model types (which may be different from the first set) trained to identify tests to run on code changes to the code in the second repository. The models can be trained using a common set of training data or different training data using the same or different features.

Model training processor 176 then trains the selected and initialized model using the features provided by feature extraction system 160 and developer feedback system 162. Also, in one example, the model training processor 176 can train multiple models in parallel, using the same or different features, but the present discussion proceeds with respect to training a single model. Model training processor 176 implements a training algorithm that can be used to train the selected model. There are a wide variety of different types of model training algorithms, such as gradient boost decision tree algorithms, or any of a wide variety of other algorithms. It will also be noted that data collection system 102 and feature extraction system 160 can collect and extract features from different data in the source code repository, including different data describing code changes and different data describing test results. The data and features discussed herein are only examples.

Once the model is trained, model evaluation system 166 evaluates the performance of the newly trained model against the performance of the model that is currently deployed in test prediction system 189. For instance, metric calculation processor 180 can calculate metrics that will be used to evaluate the model. Such metrics can include a precision metric, a recall metric, and/or other metrics. The metric values calculated for the recently trained model can be compared against the metric values calculated for the model that is currently deployed in test prediction system 189. Model promotion processor 182 can identify which of the two models performs best. If the newly trained model performs better than the model that is currently deployed in test prediction system 189, then model promotion processor 182 provides an output indicating that the model currently deployed in test prediction system 189 should be replaced by the newly trained model.

Then, when a developer 118 provides a set of code changes 120, feature extractor 190 in test selection processor 122 extracts features corresponding to the code changes 120. The features can include features of the code changes as well as features of the author (e.g., developer 118). Test prediction request generator 192 then generates a request 184 for predictions from test prediction system 189. Request 184 can include the features of the code changes and author and any developer input 138 that is provided from developer 118 as well as an identifier that identifies the particular code repository that the code changes are targeted to. Model selector 191 in test prediction system 189 then selects one or more of the models 112 based on the repository and applies the features in the request 124 to the selected prediction model 112 which generates an output indicating the likelihood or probability that each of the available tests 202 will fail if run on the code changes 120, given the features of the code changes 120. As previously mentioned, model 112 may also provide an output indicative of the importance of the test. Also, in one example, model selector 191 can transition to one or more different models 112, of different model types, for this code repository, as desired. The test results predictions 126 are provided from test prediction system 189 to test selector 194. Test selector 194 may compare the probability or likelihood that a test will fail against a threshold level to determine which tests should be run against the code changes 120. Test selector 194 outputs the list of tests 128 to test execution processor 130. Test execution processor 130 then loads and runs the tests identified in list 128 from the available tests 202 to provide test results 134.

Figure 3:
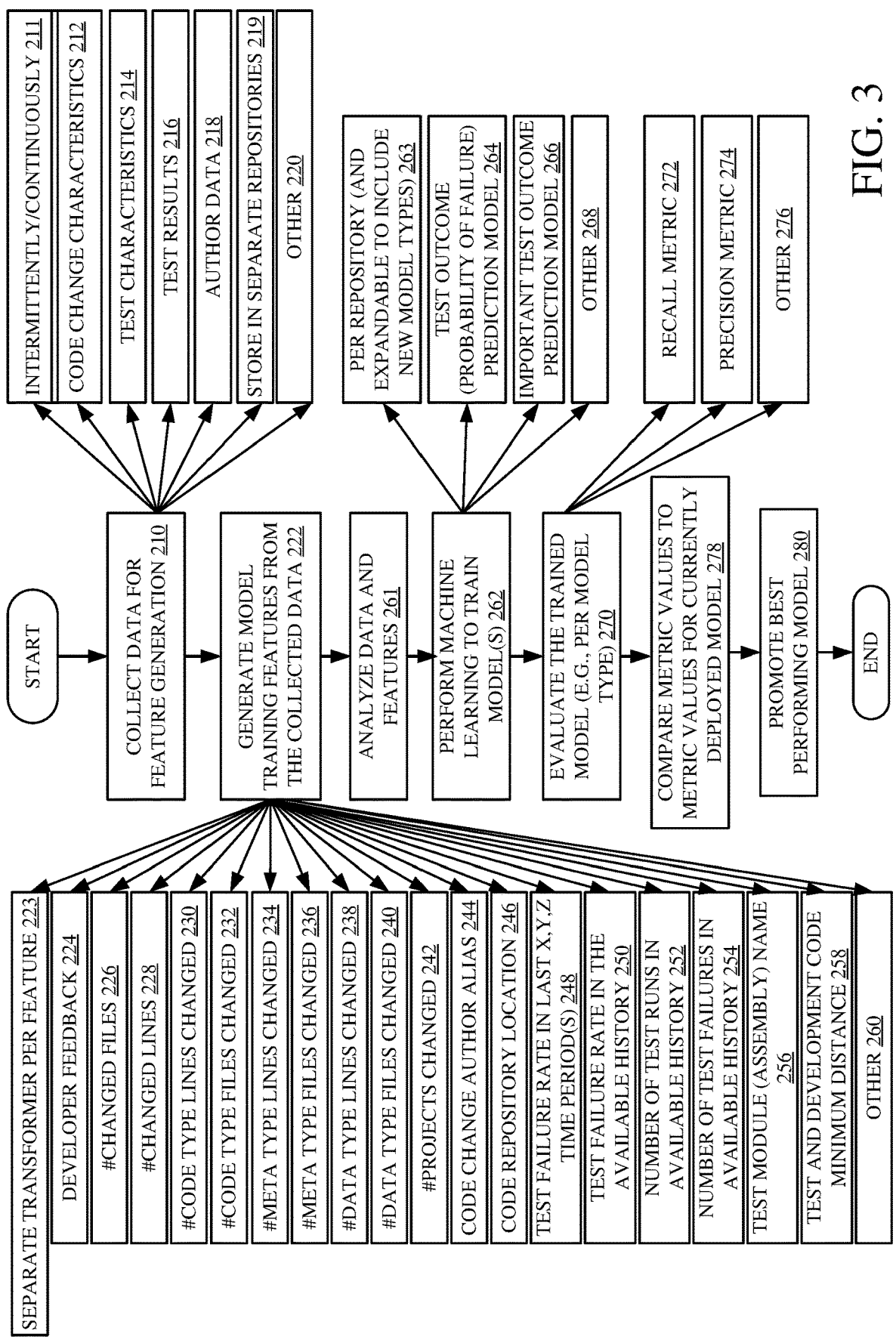
FIG. 3 is a flow diagram illustrating one example of the operation of the computing system architecture shown in the previous figures in training a machine learning model.

FIG. 3 is a flow diagram illustrating one example of the operation of model training system 110 in training a machine learning model 112 for deployment in test selection and execution system 114. It is first assumed that data collection system 102 collects data for feature generation so that the data can be used to train the machine learning model. Collecting the data for feature generation is indicated by block 210 in the flow diagram of FIG. 3. Data collection can be done periodically (or otherwise intermediately) or continuously, or in other ways, as indicated by block 211.

The data can include characteristics of various code changes as indicated by block 212, characteristics of the various available tests 202, as indicated by block 214, historical and/or simulated test results 216, author data 218, and any of a wide variety of other data 220. The test data can be stored in separate repositories or the repository from which the data came can be identified. A model can be trained for each source code repository as indicated by block 219. Separate training data can be used to train models for separate code repositories or the same training data can be used to train models for separate code repositories. The test training data can include information for tests that are run without any type of bias (such as unfiltered test results). A machine learning model trained on this type of data detects correlations between the tests themselves. The synthetic data can include test results from new tests introduced since the last time a model was trained, as well as older tests. This ensures that new tests can be selected by the model.

Feature extraction system 160 then generates features for training the machine learning model based upon data 108. In one example, a separate transformer can be run for each feature to generate the feature in a way that is suitable for use in the model training algorithm, as indicated by block 223. Generating model training features from the collected data is indicated by block 222 in the flow diagram of FIG. 3. The model training features can also include features generated based on developer feedback as indicated by block 224. Code/author feature extractor 163 can extract any of a wide variety of different features from the historical code changes 150, synthetic data 154, etc. The features of the code changes can include such things as the number of files changed 226, the number of changed lines 228, the number of code type lines changed 230, the number of code type files changed 232, the number of meta type lines changed 234, the number of meta type files changed 236, the number of data type lines changed 238, the number of data type files changed 240, the number of projects changed 242 (in cases where the source code repository stores multiple projects/components that could be related), the code change author alias 244, the code repository location 246, among other code change features. Test feature extractor 161 can extract features of any of the available tests 202. Such features can include the failure rate for each of the tests over a plurality of prior periods of time, (such as over the last 7, 14, 28, and 56 days). Generating features indicative of the test failure rate over a prior period of time is indicated by block 248 in the flow diagram of FIG. 3. The test features can include test failure rate over all available history 250, the number of times the test has been run over all available history 252, the number of test failures over all available history 254, the test module (or assembly) name 256, the test and development code distance (e.g., the minimum distance between the development code and the test code in the data repository) 258, among a variety of other features 260. Both the data and the features can be analyzed to identify flawed data, such as outliers, invalid values, or other non-meaningful records, as indicated by block 261.

Machine learning model training system 164 then performs machine learning to train one or more models, as indicated by block 262 in the flow diagram of FIG. 3. Model type selector 172 can select a particular type of model and model initialization system 174 can initialize the model. In one example, one or more models can be trained per repository (where a repository is a source code repository that stores code that may correspond to a project, for example) so the models are repository-specific models, as indicated by block 263 in the flow diagram of FIG. 3. As new projects and source code repositories are developed, the types of models can be expanded as well. Also, the types of models for even existing repositories can also be expanded. Selector 172 can select any of a variety of different types of models, such as a test outcome prediction model which predicts the probability or likelihood of failure of a particular test, as indicated by block 264. The model type can be an important test outcome prediction model 266 that is similar to model 264 except that it filters out tests that are unimportant (such as tests that frequently fail, or other unimportant tests). The machine learning model training system 164 can execute various different types of training algorithms to train other types of models in other ways as well (on a per-repository basis or otherwise), as indicated by block 268.

When model training processor 176 has finished training the model, then model evaluation system 166 evaluates the performance of the model, as indicated by block 270 in the flow diagram of FIG. 3. Where there are multiple different model types, then the models of each type can be evaluated relative to one another. For instance, metric calculation processor 180 can calculate a recall metric 272, and a precision metric 274, or a metric based on a combination of precision and recall (such as a beta-adjusted F measure) and/or any of a wide variety of other metrics 276. Model promotion processor 182 then compares the metric values to corresponding metric values from a model currently deployed in test prediction system 189, as indicated by block 278. The best performing model is promoted for each repository. For instance, if the newly trained model performs better than the currently-deployed model (according to the calculated metric values), then model deployment system 168 deploys the newly trained model in test prediction system 189 for the particular code repository that the model was trained for. If not, then the newly trained model is not deployed, and test prediction system 189 continues to use the currently-deployed model. Promoting the best performing model is indicated by block 280 in the flow diagram of FIG. 3.

Figure 4:
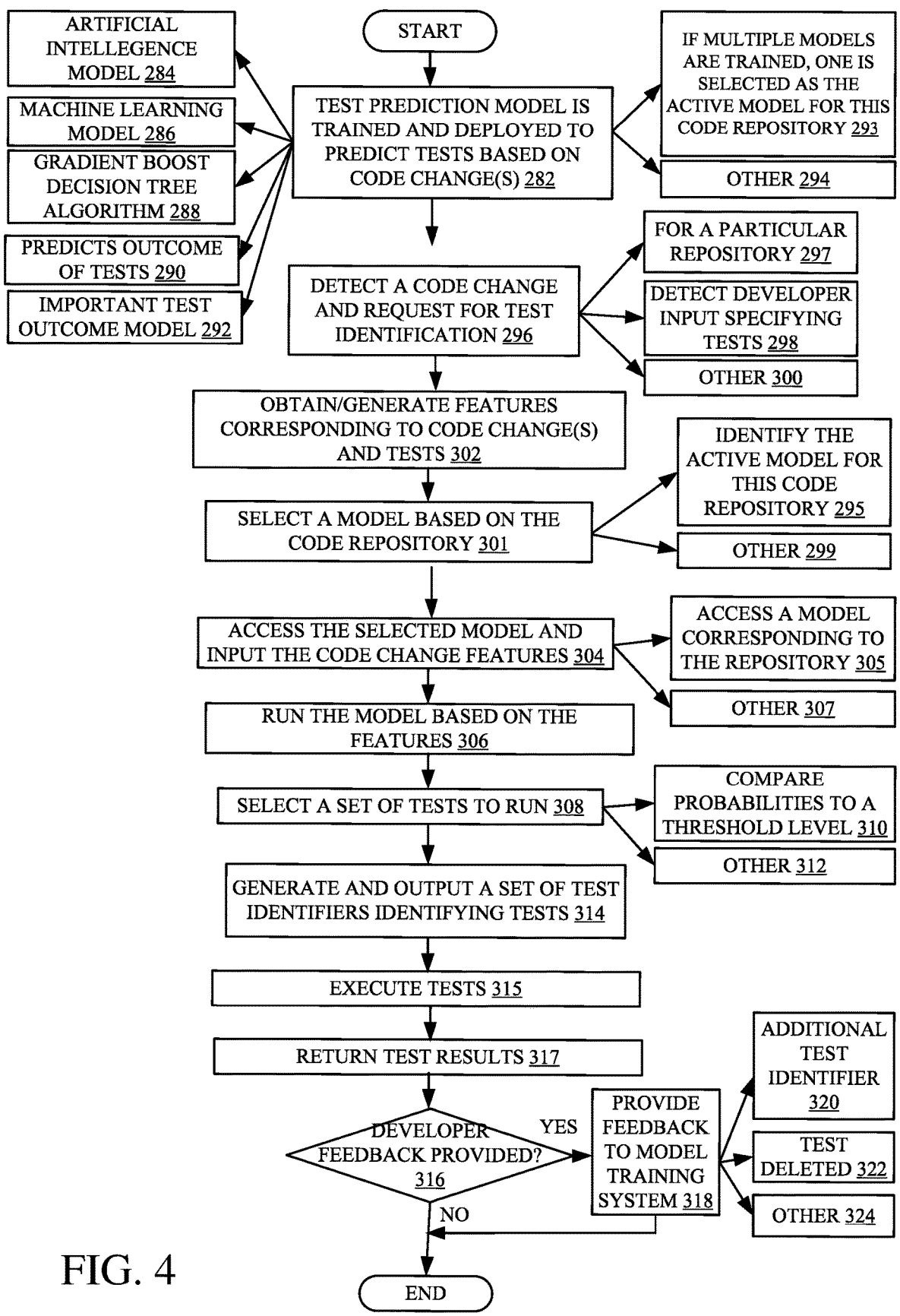
FIG. 4 is a flow diagram showing one example of the operation of the computing system architecture shown in previous figures in using a trained machine learning model to generate an output indicative of tests that should be run against a set of code changes.

FIG. 4 is a flow diagram illustrating one example of the operation of test selection and execution system 114 in receiving a set of code changes 120 and identifying tests that should be run on those code changes, and then executing those tests to generate test results 134. It is first assumed that the test prediction model 112 is trained and deployed for a code repository to predict tests (or the results of tests) based upon training data, as indicated by block 282 in the flow diagram of FIG. 4. The model may be an artificial intelligence model or another machine learning model, as indicated by blocks 284 and 286. The model training algorithm can be a gradient boost decision tree algorithm 288 or any of a wide variety of other model training algorithms. The model can be trained to predict the outcome (probability of failure) of the available tests 202, as indicated by block 290, or the outcome of important tests (as defined by default or configurable importance criteria), as indicated by block 292. There may be multiple different models trained per repository and, if there are, one is selected as the active model for this repository, as indicated by block 293. The model can be another type of model trained using another type of algorithm as well, as indicated by block 294.

Test selection processor 122 then detects that code changes 120 have been made for a repository and that tests are to be identified for execution against those code changes 120 to test the functionality of the code changes 120. Detecting a code change and request for test identification is indicated by block 296 in the flow diagram of FIG. 4. In one example, the repository corresponding to the code changes 120 is also identified, as indicated by block 297 in FIG. 4. For instance, each different project may correspond to a different repository. The developer inputs 138 may also be detected and may specify tests that developer 118 desires to have selected as well, as indicated by block 298. Other inputs, in addition to code changes 120 and developer inputs 128 can be identified as well, as indicated by block 300.

Feature extractor 190 obtains or generates features corresponding to the code changes 120 and the tests. The definition of the features is similar to the definition of the features used to train model 112. Some such features are described above with respect to FIG. 3. Obtaining or generating features corresponding to the code changes 120 and available tests 202 is indicated by block 302 in the flow diagram of FIG. 4.

Test prediction request generator 192 then generates a request 124 that can be applied to the deployed prediction model 198. The request 124 can include the features of code changes 120, and features corresponding to developer 118, the repository that is the target of the code changes 120 (where the code changes 120 are to be implemented), among other features. Based on the repository that is the target of the code changes, model selector 191 selects a model that has been trained for that repository, as indicated by block 301. Where more than one model has been trained for this repository, then the active model for this repository is identified, as indicated by block 295. The model can be selected in other ways as well, as indicated by block 299. The features are then applied to the selected model. Accessing the selected model 112 with the code change features and other features is indicated by block 304 in the flow diagram of FIG. 4. As mentioned, in one example, a repository-specific model 112 can be accessed based on the repository that the code changes 120 correspond to, as indicated by block 305 in FIG. 4. A model 112 can be accessed in other ways as well, as indicated by block 307. Test prediction system 189 then runs the deployed prediction model 212 to generate test result predictions 126. Running the model is indicated by block 306 in the flow diagram of FIG. 4.

Test selector 194 then selects a set of tests to run, based upon the test result predictions 126. Selecting a set of tests to run is indicated by block 308 in the flow diagram of FIG. 4. In one example, test selector 194 compares the probabilities that a test will fail (in the test result predictions 126) against a threshold level to select the set of tests, as indicated by block 310, or the set of tests can be based on the probabilities in other ways, as indicated by block 312. Test selector 194 eventually generates and outputs a set of predicted test identifiers identifying the list of selected tests to run, as indicated by block 314.

At some point, test execution processor 130 accesses the tests on the list of tests 128 to run and executes those tests to test the functionality in the code changes 120, as indicated by block 315 in the flow diagram of FIG. 4. Test execution processor 130 then returns the test results 134 to the developer system 116 for access by developer 118. Returning the test results is indicated by block 317 in the flow diagram of FIG. 4.

If developer feedback is provided, after developer 118 sees the list of tests that are run or have been selected to run, as determined at block 316, then the developer feedback is provided to developer feedback system 162 in model training system 110, as indicated by block 318. The developer feedback may provide additional test identifiers identifying additional tests that the developer believes should have been run, as indicated by block 320, or test deletions that indicate some of the tests that were automatically identified to be run by test selector 194 that should not have been identified. Identifying test deletions is indicated by block 322 in the flow diagram of FIG. 4. The developer feedback can include a wide variety of other items as well, as indicated by block 324, and can be incorporated in the model training process at other points in the process and/or in other ways.

It can thus be seen that the present description describes a system that trains a machine learning model (e.g., an artificial intelligence model) to predict which tests should be run against code changes to a code base. The model can be evaluated using precision and recall metrics, or other metrics, and new models can be promoted for deployment based upon their performance. The model training system enables additional models to be trained on a repository-by-repository basis. The models for one repository may be the same or different types and the types of models can vary by repository. The models can be trained using a common training data set and using the same or different features. Also, the data collection system and feature extraction system can be applied to different repository source data (e.g., data showing code changes and data showing historic test results, etc.). Further, models of distinct model types can be trained using a variety of different types of data, such as unfiltered test results data and synthetic data which may inject results from newer tests. Further, the present system facilitates capturing developer feedback and incorporating that feedback into the training system. The present system thus greatly reduces the number of tests that need to be run against code changes while still running the tests that are likely to provide meaningful information to a developer. This greatly reduces the time and computing system resources needed to run tests on code changes. For instance, it has been found that the present system can reduce the number of tests run on some code changes by approximately ninety percent (90%).

It will be noted that the above discussion has described a variety of different systems, components, models, extractors, and/or logic. It will be appreciated that such systems, components, models, extractors, and/or logic can be comprised of hardware items (such as processors and associated memory, or other processing components, some of which are described below) that perform the functions associated with those systems, components, models, extractors, and/or logic. In addition, the systems, components, models, extractors, and/or logic can be comprised of software that is loaded into a memory and is subsequently executed by a processor or server, or other computing component, as described below. The systems, components, models, extractors, and/or logic can also be comprised of different combinations of hardware, software, firmware, etc., some examples of which are described below. These are only some examples of different structures that can be used to form the systems, components, models, extractors, and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI display can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
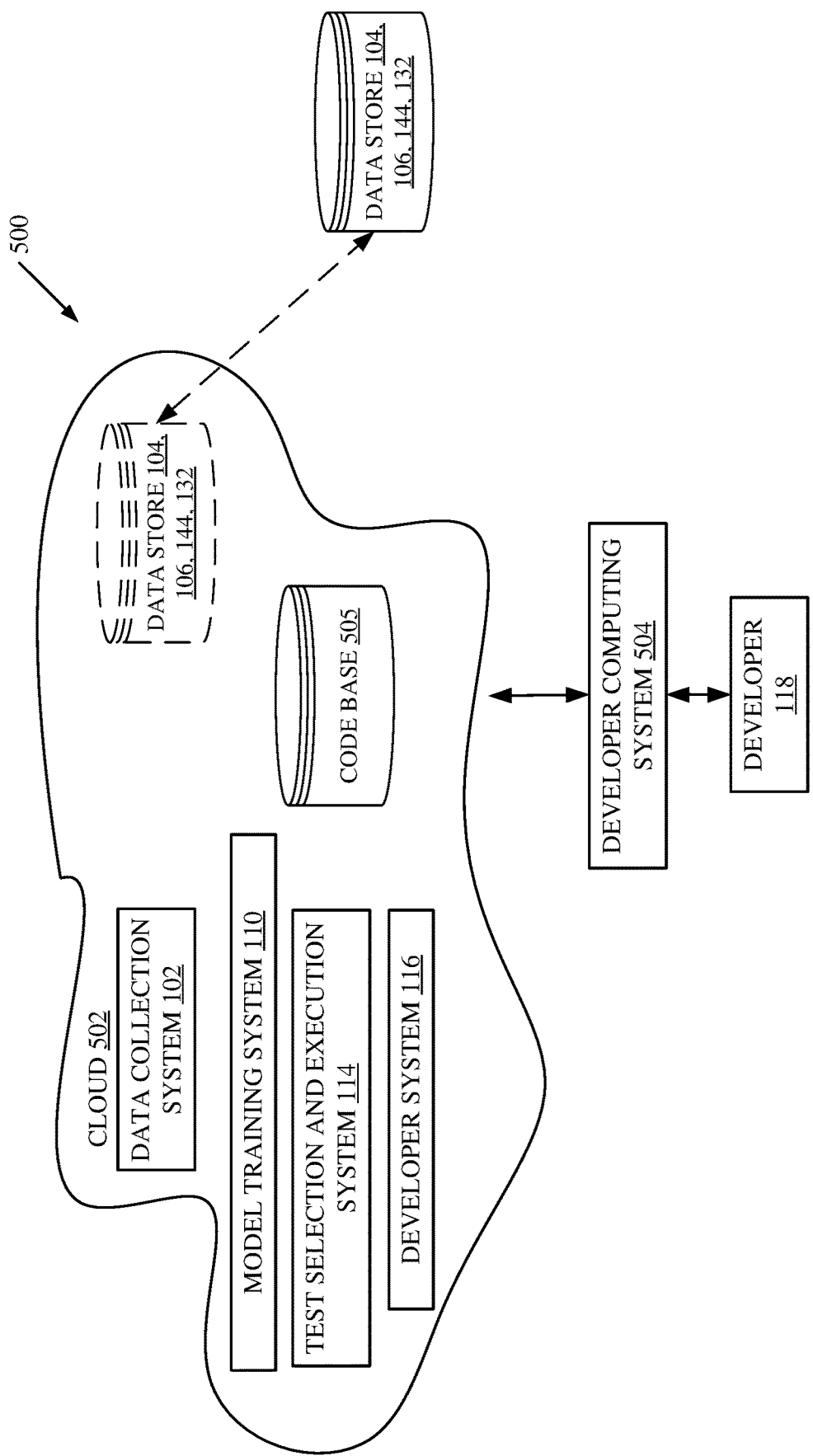
FIG. 5 is a block diagram showing one example of the computing system architecture shown in previous figures deployed in a remote server architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that systems 102, 110, 114, and 116, and data stores 104, 106, 144, and 132, as well as a code base 505 can be located in cloud 502 (which can be public, private, or a combination where portions are public while others are private). Therefore, developer 118 uses a developer computing system 504 to access those systems through cloud 502.

FIG. 5 also depicts another example of a cloud architecture. FIG. 5 shows that it is also contemplated that some elements of computing system architecture 100 can be disposed in cloud 502 while others are not. By way of example, data stores 104, 106, 132, and 144 can be disposed outside of cloud 502, and accessed through cloud 502. Regardless of where the items are located, the items can be accessed directly by system 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
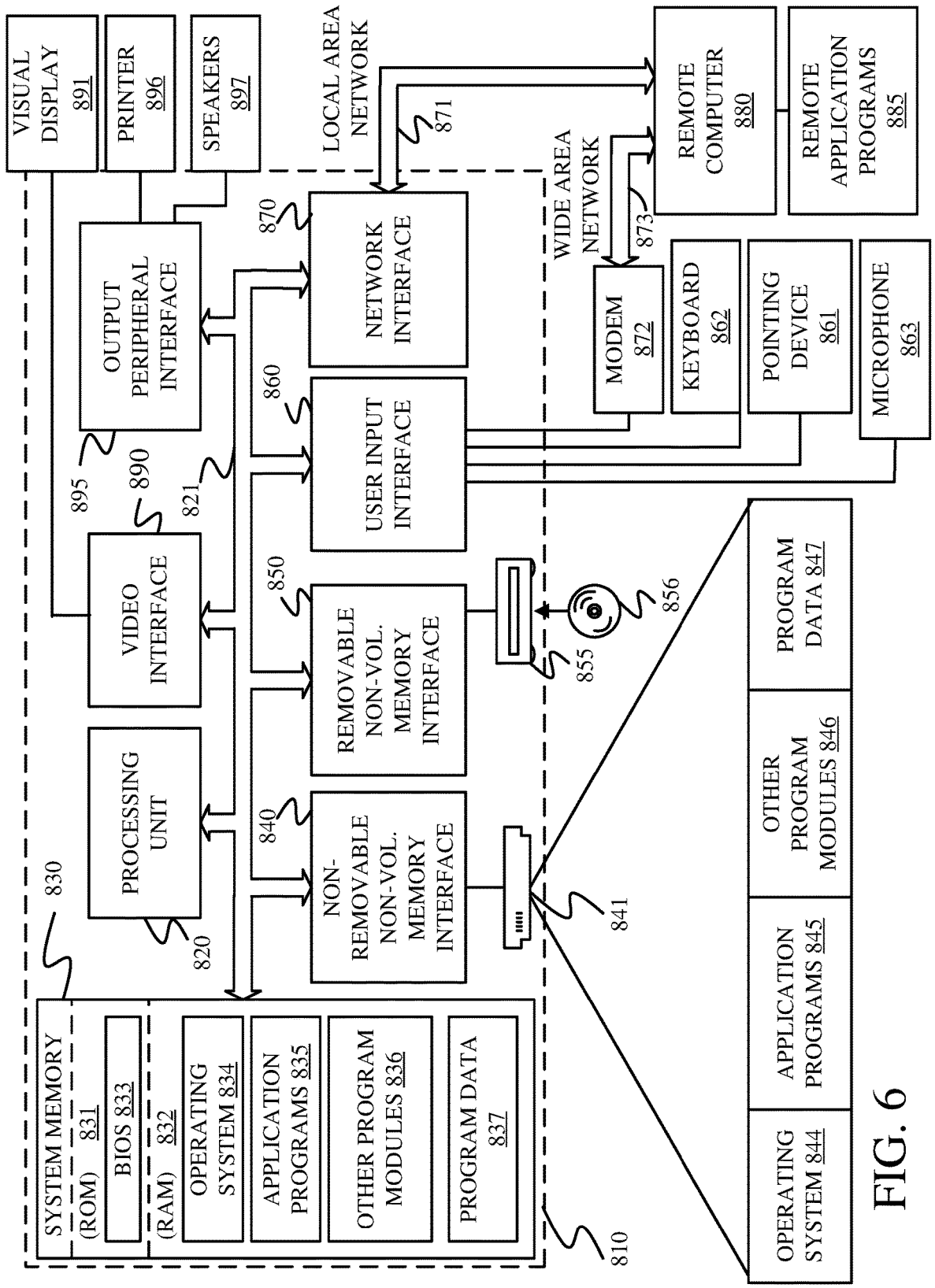
FIG. 6 is a block diagram showing one example of a computing environment that can be used in the architectures and systems shown in other figures.

FIG. 6 is one example of a computing environment in which architecture 100, or parts of it, (for example) can be deployed. With reference to FIG. 6, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of testing a code change to a code base in a code repository, comprising:
   identifying a test identification model based on the code repository;
   extracting a set of features from the code change and from a plurality of available tests;
   running the identified test identification model based on the set of features;
   generating, with the identified test identification model, a test identification output corresponding to each of the plurality of available tests, the test identification output being indicative of whether a corresponding test, if run against the code change, will fail; and
   selecting a set of tests to run against the code change based on the test identification output.

2. The computer implemented method of claim 1 and further comprising:
   receiving the code change from a development system.

3. The computer implemented method of claim 2 and further comprising:
   executing the tests in the set of selected tests to generate test results; and
   sending the test results to the development system.

4. The computer implemented method of claim 1 wherein generating the test identification output comprises:
   generating, for each of the plurality of available tests, a test result output value indicative of a likelihood that the corresponding test will fail if run against the code change.

5. The computer implemented method of claim 4 wherein selecting a set of tests to run comprises:
   comparing the test result output value to a threshold value to obtain a comparison result; and
   selecting the set of tests based on the comparison result.

6. The computer implemented method of claim 1 wherein generating the test identification output comprises:
   generating the test identification output to indicate an importance of the corresponding test in testing functionality in the code change.

7. The computer implemented method of claim 1 wherein selecting a set of tests to run comprises:
   selecting the set of tests to run based on an indicated importance of the corresponding test in testing functionality in the code change.

8. The computer implemented method of claim 1 and further comprising:
   obtaining test training data and code training data;
   generating a set of training features from the training data, and
   training a plurality of different types of test identification models corresponding to the code repository based on the training features.

9. The computer implemented method of claim 8 wherein generating a set of training features comprises:
   generating a set of test features from the test training data; and
   generating a set of code features from the code training data.

10. The computer implemented method of claim 9 wherein training the test identification model based on the training features comprises:
    detecting user feedback based on the set of selected tests, the user feedback identifying a change to the set of selected tests;
    generating feedback training features based on the detected user feedback; and
    training the test identification model based on the detected user feedback.

11. The computer implemented method of claim 8 and further comprising:
    generating an evaluation metric value corresponding to the test identification model;
    comparing the evaluation metric value corresponding to the test identification model to an evaluation metric value corresponding to a deployed test identification model to obtain a comparison result; and
    determining whether to deploy the test identification model based on the comparison result.

12. The computer implemented method of claim 11 wherein generating the evaluation metric value comprises:
    generating a recall metric value indicative of a performance of the test identification model in identifying all of the plurality of available tests that are likely to fail when executed against the code change; and
    generating a precision metric value indicative of a performance of the test identification model in filtering out tests in the plurality of available tests that are unlikely to fail when executed against the code change.

13. A computer implemented method, comprising:
    obtaining test training data based on tests run against code changes to a code base in a code repository;
    obtaining code training data based on the code changes;
    generating a set of test training features from the test training data;
    generating a set of code training features from the code training data; and
    training a plurality of different types of test identification models to receive an input code change and identify a set of tests, from a plurality of available tests, that are likely to fail when executed against the input code change, based on the test training features and the code training features.

14. The computer implemented method of claim 13 wherein training the plurality of different types of test identification models comprises:
    detecting developer feedback based on the set of selected tests, the developer feedback identifying a change to the set of selected tests;
    generating feedback training features based on the detected developer feedback; and
    training at least one of the plurality of different types of test identification models based on the detected developer feedback.

15. The computer implemented method of claim 13 and further comprising:
    generating an evaluation metric value corresponding to the test identification model;
    comparing the evaluation metric value corresponding to the test identification model to an evaluation metric value corresponding to a deployed test identification model to obtain a comparison result; and
    determining whether to deploy the test identification model based on the comparison result.

16. The computer implemented method of claim 15 wherein generating the evaluation metric value comprises:
    generating a recall metric value indicative of a performance of the test identification model in identifying all of the plurality of available tests that are likely to fail when executed against the code change; and
    generating a precision metric value indicative of a performance of the test identification model in filtering out tests in the plurality of available tests that are unlikely to fail when executed against the code change.

17. A computing system, comprising one or more hardware processors configured to:
- transmit, to a prediction model, a set of features corresponding to code changes to a code base and receive from the prediction model an output indicative of a predicted test result for a test run against the code change;
- automatically select the test for running against the code change based on predicted test result;
- run the selected test against the code change; and
- detect developer feedback relative to the selected test and include a feedback feature, generated based on the detected developer feedback, in training the prediction model.

18. The computing system of claim 17 and further comprising:
- a feature extractor configured to obtain test training data based on tests run against prior code changes to the code base, obtain code training data based on the prior code changes, generate a set of test training features from the test training data, and generate a set of code training features from the code training data; and
- a model trainer configured to train the test predictor to receive an input code change and identify a set of tests, from a plurality of available tests, that are likely to fail when executed against the input code change, based on the test training features and the code training features.

19. The computing system of claim 17 wherein the one or more hardware processors are configured to generate, for each of a plurality of available tests, a corresponding output indicative of a predicted test result value indicative of a likelihood that the corresponding test will fail if run against the code changes.

20. The computing system of claim 19 wherein the one or more hardware processors are further configured to compare the predicted test result values corresponding to the plurality of available tests to a threshold value to obtain a comparison result corresponding to each of the plurality of available tests and select a set of tests based on the comparison results.

* * * * *